United States Patent
Lanser

[19]

[11] Patent Number: 5,820,197
[45] Date of Patent: Oct. 13, 1998

[54] VISOR TORQUE CONTROL

[75] Inventor: Michael L. Lanser, Holland, Mich.

[73] Assignee: Prince Corporation, Holland, Mich.

[21] Appl. No.: 835,998

[22] Filed: Apr. 11, 1997

[51] Int. Cl.$^6$ .................................................. B60J 3/00
[52] U.S. Cl. ............................................................ 296/97.12
[58] Field of Search .............................. 296/87.1, 87.12, 296/97.13

[56] References Cited

U.S. PATENT DOCUMENTS

| | | |
|---|---|---|
| 1,862,432 | 6/1932 | Rose . |
| 2,294,317 | 8/1942 | Pelcher et al. . |
| 2,340,015 | 1/1944 | Pelcher et al. . |
| 2,496,129 | 1/1950 | Moore . |
| 2,625,426 | 1/1953 | Weymouth . |
| 2,628,861 | 2/1953 | Greig ..................................... 296/97.12 |
| 2,681,824 | 6/1954 | Knoblock . |
| 2,832,558 | 4/1958 | Lange .................................... 296/97.13 |
| 2,999,718 | 9/1961 | Handler . |
| 3,029,103 | 4/1962 | Horrocks . |
| 3,188,685 | 6/1965 | Fletcher . |
| 3,282,624 | 11/1966 | Doerfling . |
| 3,378,297 | 4/1968 | Ternes et al. . |
| 4,902,063 | 2/1990 | Crink ..................................... 296/97.12 |
| 4,921,300 | 5/1990 | Lawassani et al. . |
| 4,964,193 | 10/1990 | Rommelfaenger et al. . |
| 5,007,622 | 4/1991 | Gabas . |
| 5,026,108 | 6/1991 | Leahy . |
| 5,044,687 | 9/1991 | Abu-Shumays et al. . |
| 5,251,949 | 10/1993 | Miller et al. ......................... 296/97.12 |
| 5,338,083 | 8/1994 | Gute . |
| 5,491,874 | 2/1996 | Lowry et al. . |

FOREIGN PATENT DOCUMENTS

| | | |
|---|---|---|
| 1175712 | 11/1958 | France . |
| 1330182 | 5/1963 | France . |
| 2407836 | 7/1979 | France . |

Primary Examiner—Gary C. Hoge
Assistant Examiner—Ken Patel
Attorney, Agent, or Firm—Price, Heneveld, Cooper, DeWitt & Litton

[57] ABSTRACT

A visor torque control comprises a spring steel body having a flange adapted to be mounted to the body of a visor and a semicylindrical collar for circumscribing at least a portion of a cylindrical visor rod. The end of the semicylindrical collar in one embodiment integrally includes an outwardly projecting tang which allows the torque control to be snap-fitted over the visor rod and further allows the diameter of the collar to be selectively adjusted. The interior of the spring steel member is integrally coated with a polymeric material to provide the desired frictional characteristics and operational feel of the rotation of the visor about the visor rod.

26 Claims, 1 Drawing Sheet

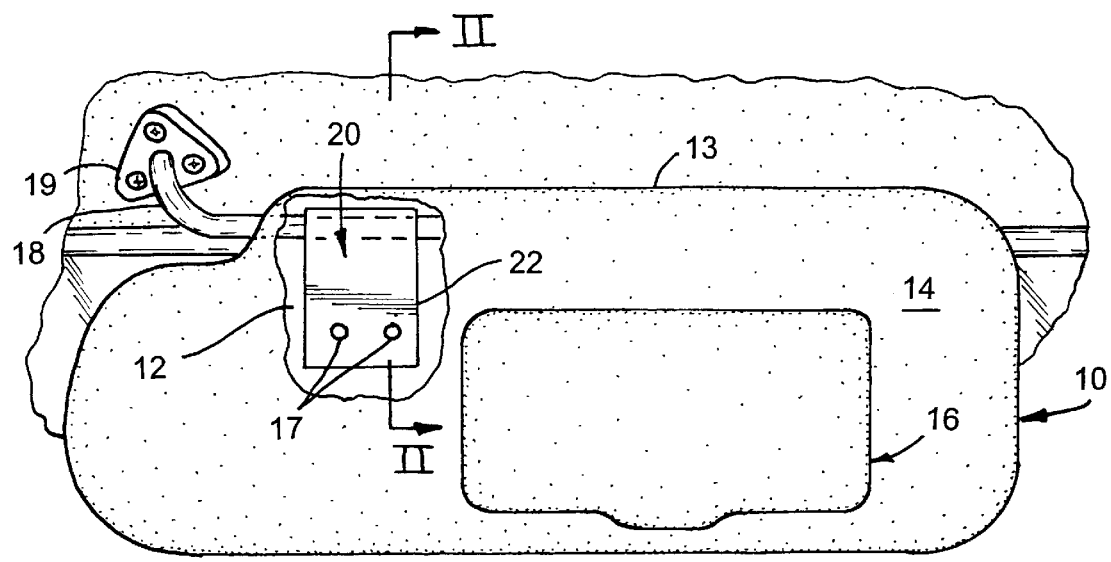
Fig. 1
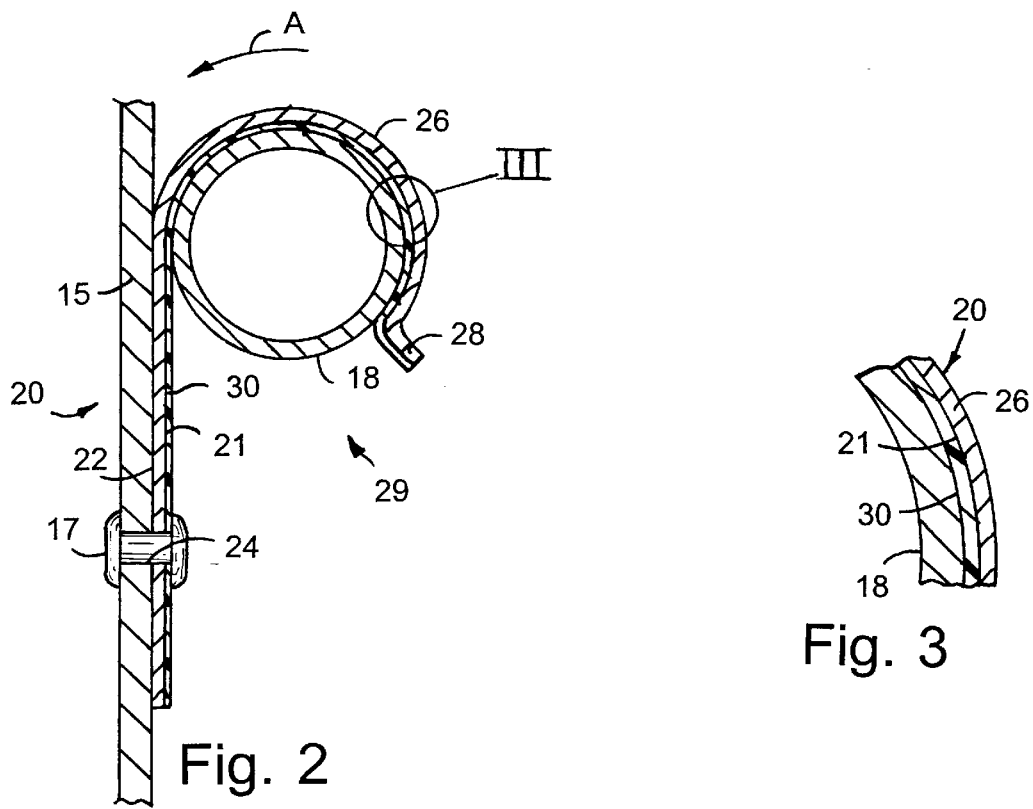
Fig. 2
Fig. 3

VISOR TORQUE CONTROL

BACKGROUND OF THE INVENTION

The present invention relates to a visor torque control.

There exists numerous visor torque controls which are designed to allow a visor to pivot from a stored position adjacent the vehicle headliner to selected lowered use positions. The design of such torque controls require that the visor be relatively easily lowered to selected use positions and yet maintain their adjusted position during movement of the vehicle. Some torque controls also provide detent positions for snap-locking the visor in a raised stored position and/or a primary lowered use position. An example of one such torque control which has been in widespread commercial use is represented by U.S. Pat. No. 4,500,131.

Visors frequently include a variety of accessories, such as illuminated vanity mirrors add in recent years trainable garage door opening transmitters, cellular telephones and the like. Such accessories integrated into visor bodies add to the weight of the visor making the torque control more difficult to design and successfully hold a visor in a desired adjusted position and yet allow ease of use.

Wraparound torque controls have been proposed for relatively simple visor designs in which the entire length of a visor surrounds a fixed rod as disclosed, for example, in U.S. Pat. No. 1,862,432. Such construction, although functional for the early vintage vehicle visors described therein, is not applicable to modern visor construction. Also, proposals have suggested using a wraparound-type torque control in connection with a polymeric sleeve between the control and the visor rod. French Patent No. 2 407 836 suggests such structure. One difficulty with a relatively thick polymeric sleeve, however, is that, with use of heavier accessory-laden visors, the sleeve material tends to deform or "creep", thus, loosening the interface between the visor and the pivot rod. Further, the sleeve adds an element of additional cost to the torque control.

There exists a need, therefore, for a visor torque control which is relatively inexpensive and yet meets the design criteria necessary for modern visor designs. Further, with the increasing sensitivity of the cost of vehicle components by manufacturers, it is desirable to have a visor torque control which is relatively inexpensive and requires less tooling and material costs.

SUMMARY OF THE PRESENT INVENTION

The torque control of the present invention solves the need for a relatively inexpensive torque control and yet one which is capable of satisfying the design criteria for modern vehicle visors. It accomplishes this goal by providing a visor torque control made of a spring steel formed to circumscribe a substantial portion of a cylindrical visor pivot rod and includes a polymeric coating on a surface which engages the pivot rod such that the visor to which the torque control is fixedly attached can rotate about the pivot rod with relative ease and yet be held in a secure, adjusted position. In a preferred embodiment of the invention, the visor torque control comprises a spring steel body having a flange adapted to be mounted to the body of a visor and an integral semicylindrical section circumscribing at least a portion of a cylindrical visor pivot rod. The end of the semicylindrical section remote from the flange in one embodiment integrally includes an outwardly projecting tang which assists in spreading the torque control open to allow a visor pivot rod to be inserted. The tang further allows the diameter of the semicylindrical section of the torque control to be selectively adjusted. The interior surface of the spring steel body is integrally coated with a polymeric material to provide the desired frictional characteristics and operational feel of the rotation of the visor about the visor rod. Such a torque control, therefore, provides a relatively inexpensive torque control which can be tooled for manufacturing at a relatively low cost and provide an effective torque control which can be readily assembled to the pivot rod and visor during manufacturing.

These and other features, objects and advantages of the present invention will become apparent to those skilled in the art upon reading the following description thereof together with reference to the accompanying drawings.

BRIEF DESCRIPTION OF THE DRAWINGS

FIG. 1 is a front elevational view of a visor, partly broken away, showing the torque control of the present invention;

FIG. 2 is an enlarged vertical cross-sectional view of the torque control and visor rod taken along section line II—II of FIG. 1; and FIG. 3 is a greatly enlarged fragmentary cross-sectional view of the circled area III of FIG. 2.

DETAILED DESCRIPTION OF THE PREFERRED EMBODIMENT

Referring initially to FIG. 1, there is shown a visor 10 for a vehicle, such as an automobile. The visor includes a visor body 12 typically having a butterfly core construction with two panels folded over at the top edge 13 of the visor for forming a hollow, lightweight and yet strong visor body covered by a suitable upholstery fabric 14 conforming the visor to the interior decor of the vehicle into which it is installed. Visor 10 may optionally include an illuminated vanity mirror assembly 16, which can be of the type described in U.S. Pat. No. 5,331,518, the disclosure of which is incorporated herein by reference. A visor core construction which can accommodate the torque control 20 of the present invention is disclosed in U.S. Pat. No. 5,007,532, the disclosure of which is incorporated herein by reference. Torque control 20 is mounted over a generally cylindrical pivot rod 18 which extends within the visor body 12 and includes an elbow terminating in a mounting bracket 19 of conventional construction for securing the visor 10 to the roof of a vehicle. The torque control 20, thus, is fixedly mounted to the visor body 12 by, in ore embodiment, fastening means such as rivets 17 extending through the front wall 15 (FIG. 2) of visor body 12 to secure the torque control to the visor body. In the event a polymeric core is employed, the apertures 24 (FIG. 2) receive fused polymeric material for the retention of the torque control. This allows the visor to rotate about the longitudinal axis of pivot rod 18 and hold its position in the selected lowered use position as illustrated in FIG. 1 or a raised position against the vehicle headliner when not in use. Pivot rod 18 can be hollow to accommodate the electrical supply conductors (not shown) for the covered illuminated vanity mirror assembly 16.

The torque control 20 is formed from a generally rectangular spring steel member made of prehardened 0.040 gauge steel having a downwardly projecting flange 22 with spaced apertures 24 for attaching the torque control 20 to the one half of the visor body as illustrated in FIG. 1. Torque control 20 is formed to integrally include a semicylindrical section or collar 26, which at least partially circumscribing the pivot rod 18, as seen in FIG. 2. In the preferred embodiment, collar 26 circumscribes approximately 270° of the pivot rod 18. The spring steel torque control 20 also integrally includes at an end from collar 26 remote from flange 22, an outwardly projecting tang 28 which defines in conjunction with flange 22 an opening slot 29 for snap-fitting the torque control 20 over visor rod 18 during assembly.

The interior surface 21 of torque control 20 facing rod 18 when assembled is coated with a polymeric material 30, as best seen in FIG. 3, at least in the collar area 26, although preferably the entire interior surface 21 of torque control 20 is coated. The coating material can be an epoxy-based material or a polyester having from about 15–20% and preferably 17% of PTFE (Teflon™) compounded with the base polymeric material. The thickness of coating 30 in the preferred embodiment is from about 0.0005 to about 0.001 inch thick with the torque control 20 being precoated prior to its forming.

The collar 26 of torque control 20 has a generally cylindrical radius of curvature to conform to the curvature of the cylindrical zinc-plated steel visor rod 18, typically having an outer diameter of approximately 0.312 inch. The torque control tang 28 can be compressed toward flange 22 to increase the compression of the torque control around pivot rod 18 as desired for the level of torque required for a given visor. Typically, the torque control will provide a greater holding torque, holding the visor in the stored position, preventing the visor from drooping once stored against the headliner. This is achieved by the tendency of the collar 26 to wrap around and engage the visor rod as the visor is rotated in a lowering direction, indicated by arrow A in FIG. 2, thus tending to hold the visor in position. When the visor is being raised in a direction opposite arrow A, however, the collar 26 tends to unwrap the torque control from the pivot rod 18, thereby providing approximately 40% less torque and making it easier to raise the visor to a stored or adjusted position. Once reached, the torque control securely holds the visor in such adjusted position. In the preferred embodiment of the invention, the width of the torque control is approximately 2 inches which provides, in conjunction with the coating and inner diameter of collar 26, the desired 0.8–1.0 NM torque when moved in the direction of arrow A.

The construction of the torque control, therefore, is relatively inexpensive with the polymeric coating 30 also providing rust prevention in addition to the desired lubricous interface between the torque control and visor rod 18. The visor rod 18 may include suitable projections on opposite edges of the torque control 20 to align and maintain the position of the torque control along the longitudinal axis of pivot rod 18 as desired. Also, in some embodiments, collar 26 may not have a uniform radius of curvature but rather a compound curvature to provide a selected torque. The depression of tang 28 may effect such a curvature which will still remain generally semicylindrical.

It will become apparent to those skilled in the art that these and other modifications to the preferred embodiment of the invention as described herein can be made without departing from the spirit or scope of the invention as defined by the appended claims.

The embodiments of the invention in which an exclusive property or privilege is claimed are defined as follows:

1. A visor torque control comprising:
   a spring steel body having a mounting flange extending from one end;
   a generally semicylindrical collar integrally formed on said mounting flange;
   an outwardly projecting tang extending from said collar at an end remote from said mounting flange; and
   a polymeric coating integrally formed on at least an interior surface of said collar for interfacing with a visor pivot rod.

2. The torque control as defined in claim 1 wherein said polymeric coating comprises an epoxy-based material with a PTFE filler.

3. The torque control as defined in claim 2 wherein said polymeric coating comprises an epoxy-based material of from about 80–85% and 15–20% of PTFE.

4. The torque control as defined in claim 3 wherein said coating is from about 0.0005 to about 0.001 inch thick.

5. The torque control as defined in claim 4 wherein said spring steel comprises 0.040 inch prehardened steel.

6. The torque control as defined in claim 5 wherein said flange includes at least one aperture for receiving a fastener for attaching said torque control to a visor body.

7. The torque control as defined in claim 1 wherein said collar circumscribes approximately 270°.

8. The torque control as defined in claim 7 wherein said tang projects outwardly from said flange to define an enlarged slot such that said torque control can be snapped over a cylindrical pivot rod.

9. A visor pivot rod and torque control comprising:
   an elongated cylindrical visor pivot rod; and
   a torque control mounted to said pivot rod, said torque control including a spring steel body having a mounting flange extending from one end, a collar integrally formed on said mounting flange in the shape of a semicylindrical member, and a polymeric coating integrally formed on the interior surface of said collar and engaging said visor pivot rod.

10. The apparatus as defined in claim 9 wherein said polymeric coating comprises an epoxy-based material with a PTFE filler.

11. The apparatus as defined in claim 10 wherein said polymeric coating comprises an epoxy-based material of approximately 80% and including approximately 20% of PTFE.

12. The apparatus as defined in claim 11 wherein said coating is from about 0.0005 to about 0.001 inch thick.

13. The apparatus as defined in claim 12 wherein said spring steel comprises 0.040 inch steel.

14. The apparatus as defined in claim 13 wherein said flange includes at least one aperture for receiving a fastener for attaching said torque control to a visor body.

15. The apparatus as defined in claim 9 wherein said collar circumscribes approximately 270°.

16. The apparatus as defined in claim 9 and further including a tang extending outwardly from said collar at an end of said collar remote from said flange.

17. The apparatus as defined in claim 16 wherein said tang projects outwardly from said flange to define an enlarged slot such that said torque control can be snapped over a cylindrical pivot rod.

18. A visor comprising:
   a visor body;
   an elongated cylindrical visor pivot rod for mounting said visor to a vehicle; and
   a torque control mounted to said pivot rod, said torque control including a spring steel body having a mounting flange extending from one end, a collar integrally formed on said mounting flange in the shape of a semicylindrical member, and a polymeric coating integrally formed on the interior surface of said collar and engaging said visor pivot rod.

19. The visor as defined in claim 18 wherein said polymeric coating comprises an epoxy-based material with a PTFE filler.

20. The visor as defined in claim 19 wherein said polymeric coating comprises an epoxy-based material of approximately 80% and including approximately 20% of PTFE.

21. The visor as defined in claim 20 wherein said coating is from about 0.0005 to about 0.001 inch thick.

22. The visor as defined in claim 21 wherein said spring steel comprises 0.040 inch steel.

23. The visor as defined in claim 22 wherein said flange includes at least one aperture for receiving a fastener for attaching said torque control to a visor body.

24. The visor as defined in claim 18 wherein said collar circumscribes approximately 270°.

25. The visor as defined in claim 18 and further including a tang extending outwardly from said collar at an end of said collar remote from said flange.

26. The visor as defined in claim 25 wherein said tang projects outwardly from said flange to define an enlarged slot such that said torque control can be snapped over a cylindrical pivot rod.

\* \* \* \* \*